United States Patent
Ma

(10) Patent No.: US 8,368,260 B2
(45) Date of Patent: Feb. 5, 2013

(54) INSTANTANEOUS MAGNETODYNAMIC GENERATOR

(75) Inventor: Yuan-Ron Ma, Hualien (TW)

(73) Assignee: National Dong Hwa University, Hualien (TW)

( * ) Notice: Subject to any disclaimer, the term of this patent is extended or adjusted under 35 U.S.C. 154(b) by 175 days.

(21) Appl. No.: 12/913,946

(22) Filed: Oct. 28, 2010

(65) Prior Publication Data

US 2012/0104876 A1 May 3, 2012

(51) Int. Cl.
*H02K 35/00* (2006.01)
(52) U.S. Cl. .......................................... 310/15
(58) Field of Classification Search .................... None
See application file for complete search history.

(56) References Cited

U.S. PATENT DOCUMENTS

| | | | |
|---|---|---|---|
| 2009/0140591 A1* | 6/2009 | Blessing et al. | 310/156.37 |
| 2009/0179523 A1* | 7/2009 | Wang et al. | 310/338 |
| 2009/0226768 A1 | 9/2009 | Wang et al. | |
| 2009/0309458 A1 | 12/2009 | Chou | |

FOREIGN PATENT DOCUMENTS

CN 101404468 A * 4/2009

OTHER PUBLICATIONS

CN 101404468 A Machine Translation.*
Xing et al, Wideband vibration energy harvester with high permeability magnetic material, Sep. 29, 2009, American Institute of Physics.*
Zhong Lin Wang, Xudong Wang, Jinhui Song, Jin Liu and Yifan Gao; Piezoelectric Nanogenerators for Self-Powered Nanodevices;IEEE Pervasive Computing (magazine); Jan.-Mar. 2008; 8 pages; vol. 7, No. 1; Published by IEEE Computer Society; Washington, D.C.
Xudong Wang, Jinhui Song, Jin Liu, Zhong Lin Wang; Direct-Current Nanogenerator Driven by Ultra sonic Waves; Science (journal); Apr. 6, 2007; 4 pages; vol. 316; Published by American Association for the Advancement of Science (AAAS).
Pu Xian Gao, Jinhui Song, Jin Liu and Zhong Lin Wang; Nanowire Piezoelectric Nanagenerators on Plastic Substrates as Flexible Power Sources for Nanodevices; Advanced Materials (journal); Jan. 2007; 6 pages; vol. 19, Issue 1; Published by Wiley-VCH Verlag GmbH & Co. KGaA.

* cited by examiner

*Primary Examiner* — Quyen Leung
*Assistant Examiner* — Thomas Truong
(74) *Attorney, Agent, or Firm* — Alan Kamrath; Kamrath IP Lawfirm, P.A.

(57) ABSTRACT

An instantaneous magnetodynamic generator includes a magnetic plate and a first metallic electrode plate. The magnetic plate has at least one pair of N and S magnetic poles. One magnetic pole of the pair of N and S magnetic poles has a first magnetic pole face, and the other magnetic pole of the pair of N and S magnetic poles has a second magnetic pole face. The first metallic electrode plate has an electrode face and at least one metallic wire. The electrode face faces the first and second magnetic pole faces. The metallic wire has a free end moving between a position beneath the first magnetic pole face and a position beneath the second magnetic pole face to induce a positive or negative tunneling current on the first metallic electrode plate.

6 Claims, 9 Drawing Sheets

INSTANTANEOUS MAGNETODYNAMIC GENERATOR

BACKGROUND OF THE INVENTION

1. Field of the Invention

The invention generally relates to an instantaneous magnetodynamic generator (IMNG) associated with an alternating tunneling current (AC) device. The IMNG can generate, with violent shakes, a large current between arrays of metallic wires (or rods) and a magnetic plate. However, the violent shakes will not damage the arrays of metallic wires or rods during the violent shakes.

2. Description of the Related Art

FIG. 1 shows a conventional DC nanogenerator 8, which includes a top electrode plate 81 and a bottom electrode plate 82. The top electrode plate 81 is a metal plate having a zigzag face coated with platinum (Pt). The bottom electrode plate 82 includes oxide (ZnO) piezoelectric nanowires 821 aligned vertically in an array. The Pt coating on the zigzag face not only enhances the conductivity of the zigzag face, but also creates a Schottky contact at the interface with ZnO. The nanowires 821 are placed at a small distance beneath the zigzag face of the top electrode plate 81. The DC nanogenerator 8 is driven by an ultrasonic wave U to generate a DC current that passes through a load 9. Specifically, the ultrasonic wave U drives the top electrode plate 81 up and down to bend and/or vibrate the nanowires 821 for generation of the DC current.

A side view of the DC nanogenerator 8 is shown in FIG. 2A. When the ultrasonic wave U is not yet applied to drive the top electrode plate 81, the top electrode plate 81 cannot move down to touch the nanowires 821. Thus, no piezoelectric charge can be generated. As shown in FIG. 2B, when the ultrasonic wave U is applied to drive the top electrode plate 81, the top electrode plate 81 can move up and down. As the top electrode plate 81 moves down and presses the nanowires 821, the nanowires 821 are laterally deflected. Since the nanowires 821 are made of a piezoelectric material, their lateral deflections can cause voltage differences between two sides of the nanowires 821, as the negative (V−) and positive (V+) charges shown in FIG. 2B.

Note that when the nanowires 821 are deflected by the top electrode plate 81 too frequently, the nanowires 821 are easily damaged. Therefore, the safety design of the DC nanogenerator 8 needs to be improved.

SUMMARY OF THE INVENTION

The primary objective of this invention is to provide an instantaneous magnetodynamic generator which generates, with violent shakes, a large alternating tunneling current between arrays of metallic wires (or rods) and a magnetic plate. The invention also includes arrays of metallic vertically-aligned wires (or rods), but the advantage of the invention is that the wire arrays can gather alternative tunneling current without crashes. The metallic wires will not crash into the surface of the magnetic plate during the violent shakes, because there is a gap between the metallic wires and the magnetic plate.

The instantaneous magnetodynamic generator includes a magnetic plate and a metallic electrode plate. The magnetic plate consists of a plurality of pairs of N and S magnetic poles. The metallic electrode plate is comprised of metallic wires (or rods). When the metallic electrode plate approaches the magnetic plate, the metallic wires enter the magnetic flux of the pairs of N and S magnetic poles. It is assumed that there is only one metallic wire beneath the S magnetic pole, as shown in FIG. 3A. When the metallic wire shifts to the right position just beneath the N magnetic pole as shown in FIG. 3B, a positive tunneling current occurs between the metallic wire and the magnetic plate. When the metallic wire shifts back to the left position just beneath the S magnetic pole as shown in FIG. 3C, a negative tunneling current takes place between the metallic wire and the magnetic plate. Therefore, as the metallic wire shifts back and forth between the S and N magnetic poles, the alternative tunneling current occurs between the metallic wire and the magnetic plate.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
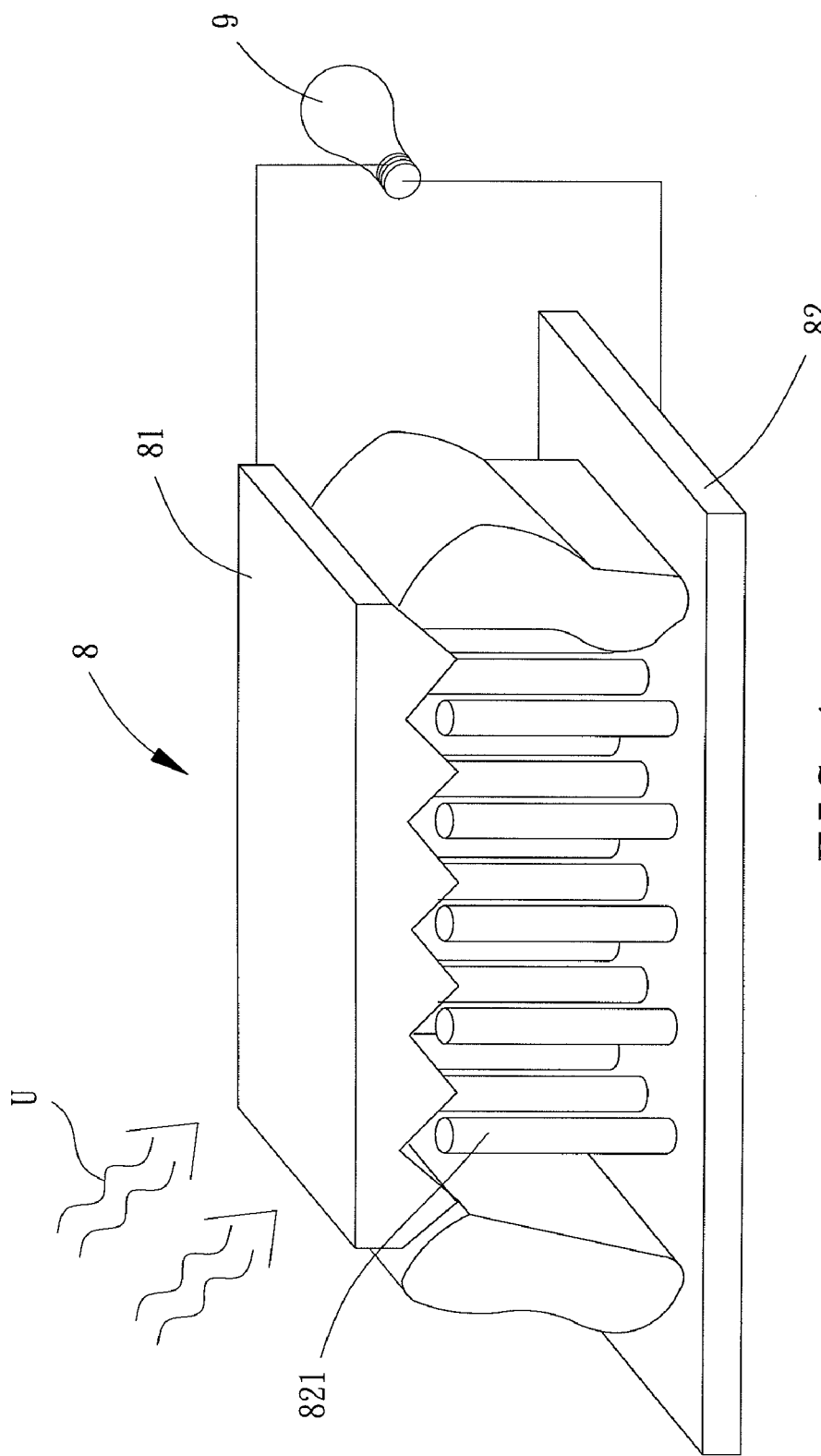
FIG. 1 shows a conventional direct current (DC) nanogenerator.
Figure 2A:
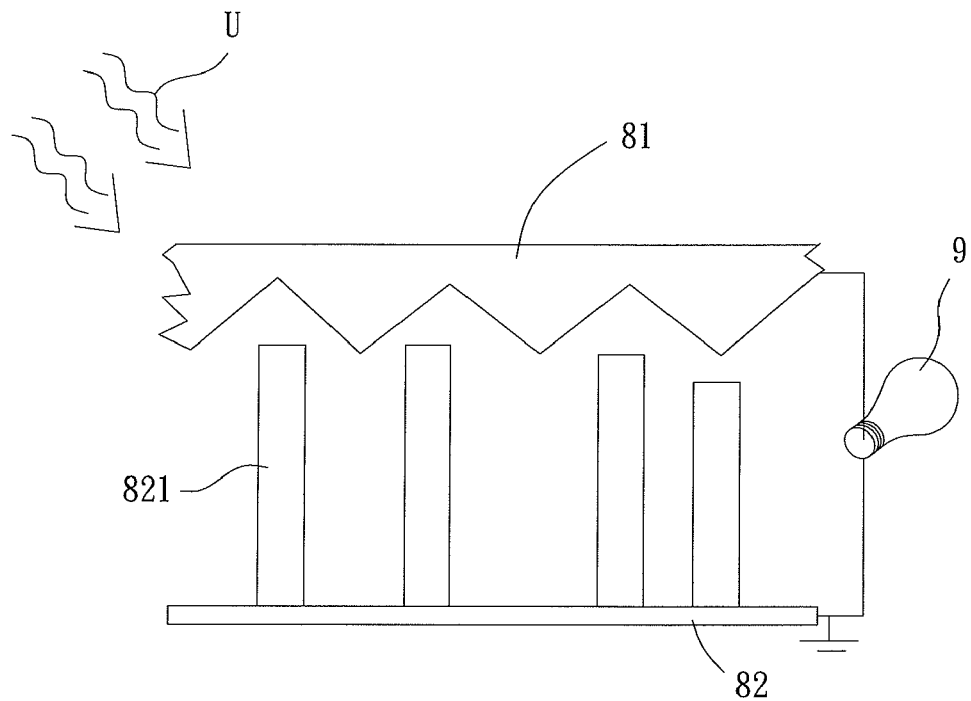
FIG. 2A shows a side view of the conventional DC generator without the application of an ultrasonic wave.
Figure 2B:
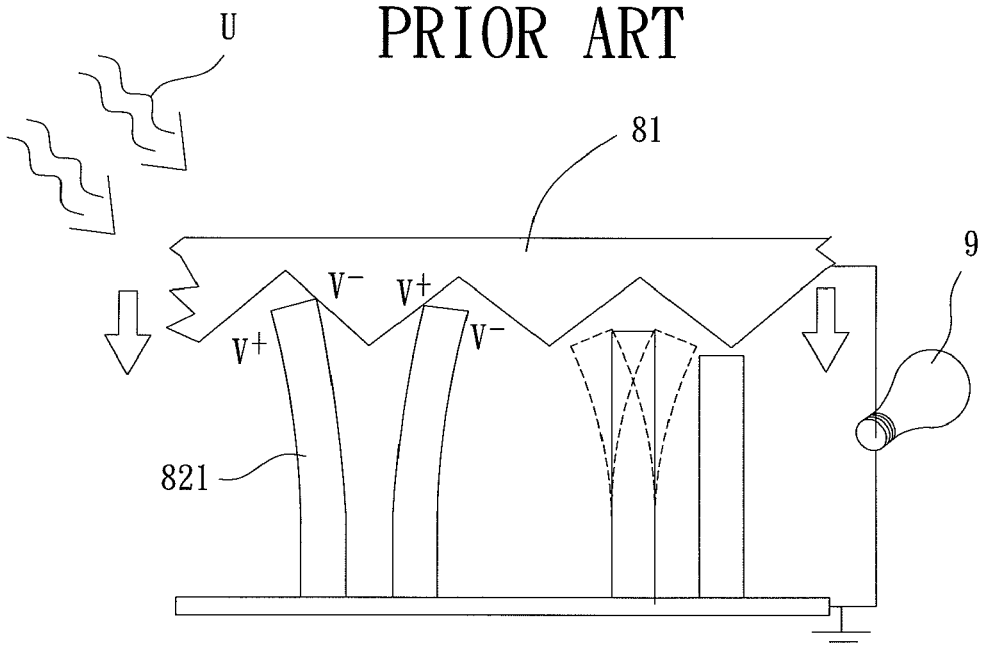
FIG. 2B shows a side view of the conventional DC generator with the application of the ultrasonic wave.

In the various figures of the drawings, the same numerals designate the same or similar parts. Furthermore, when the terms "first", "second", "third", "fourth", "inner", "outer" "top", "bottom" and similar terms are used hereinafter, it should be understood that these terms refer only to the structure shown in the drawings as it would appear to a person viewing the drawings and are utilized only to facilitate describing the invention.

DETAILED DESCRIPTION OF THE INVENTION

Figure 3A:
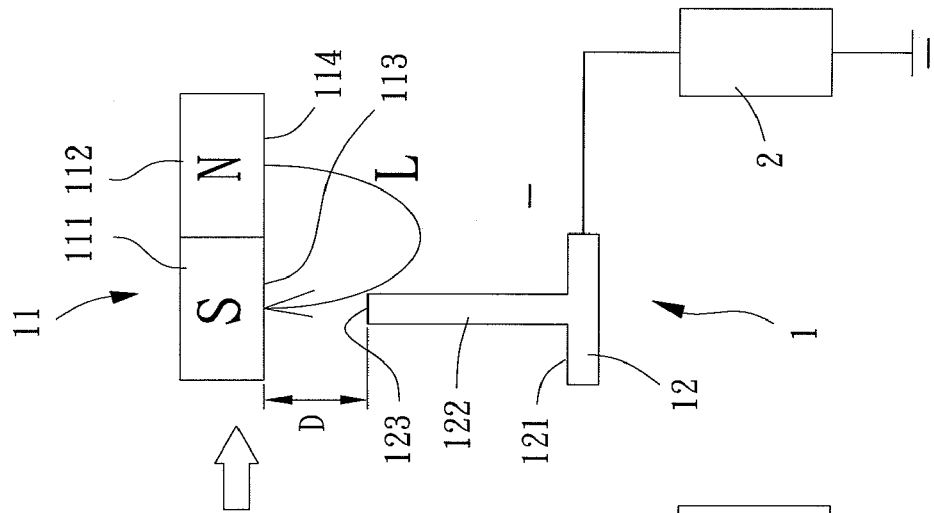
FIGS. 3A, 3B and 3C show an instantaneous magnetodynamic generator with only one metallic wire and a pair of S and N magnetic poles according to a first embodiment of the invention.
Figure 3B:
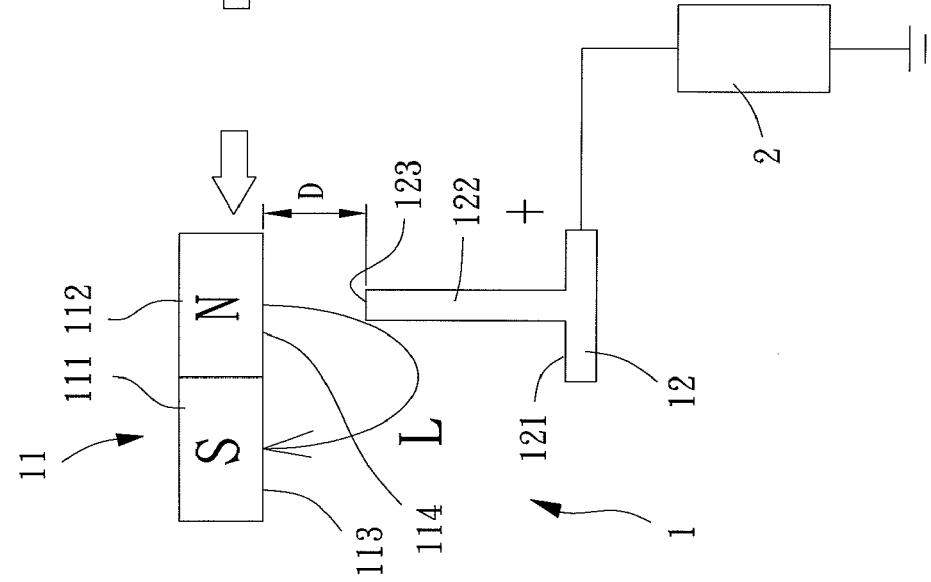
Figure 3C:
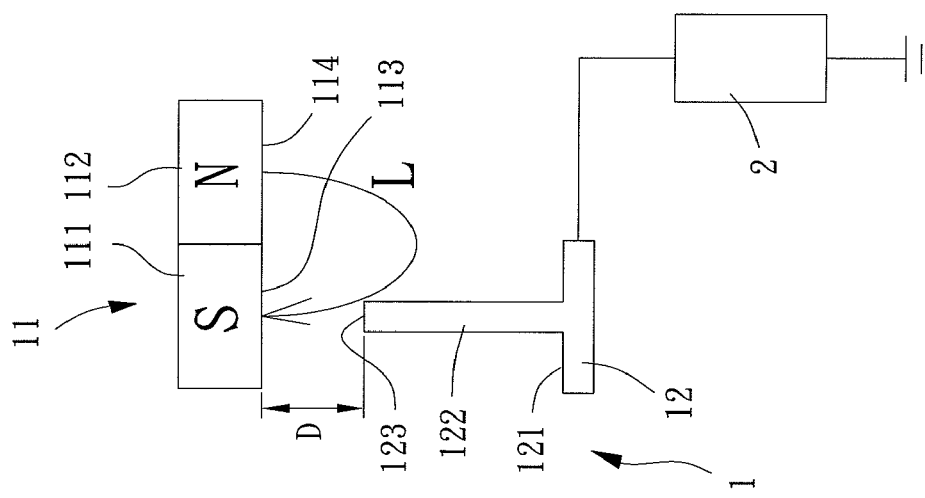

Referring to FIG. 3A, an instantaneous magnetodynamic generator 1 is shown according to a first embodiment of the invention. The instantaneous magnetodynamic generator 1 comprises a magnetic plate 11 and a metallic electrode plate 12. The magnetic plate 11 includes an S magnetic pole 111 and an N magnetic pole 112. The S magnetic pole 111 has an S magnetic pole face 113, and the N magnetic pole 112 has an N magnetic pole face 114. FIGS. 3A, 3B and 3C also show a line representing the magnetic flux L from the N magnetic pole face 114 to the S magnetic pole face 113. The metallic electrode plate 12 is connected to a load 2 and includes an electrode face 121 and a metallic wire 122. The metallic wire 122 may be implemented as a metallic nanowire, but is not limited thereto. The electrode face 121 faces the S magnetic pole face 113 and the N magnetic pole face 114. The metallic wire 122 is implemented as wire arrays in the invention. The metallic wire 122 extends substantially from the electrode face 121 towards the magnetic plate 11, and has a free end 123 beneath the magnetic plate 11 at a distance D, which is preferably about 1-10 μm. Based on the structure, the instantaneous magnetodynamic generator can be shaken by hand to cause relative movement between the magnetic plate 11 and the metallic electrode plate 12, allowing the free end 123 of the metallic wire 122 to move back and forth between the position beneath the S magnetic pole face 113 and the position beneath the N magnetic pole face 114. Alternatively, an ultrasonic wave can also be applied to drive the first electrode plate 12 for movement, forcing the free end 123 of the metallic wire 122 to move between the position beneath the first magnetic pole face (N or S, namely, 113 or 114) and the position beneath the second magnetic pole face (S or N, namely, 114 or 113). Therefore, the free end 123 lies in the magnetic flux L of the S magnetic pole face 113 and the N magnetic pole face 114. When the free end 123 moves across the boundary of the magnetic flux L between the S magnetic pole face 113 and the N magnetic pole face 114, an alternative tunneling current will be generated and guided to the load 2, as shown below.

As stated above, the instantaneous magnetodynamic generator 1 can be shaken by hand to cause relative movement between the magnetic plate 11 and the metallic electrode plate 12. When the magnetic plate 11 is shifted left, the free end 123 of the metallic wire 122 is moved from the position beneath the S magnetic pole face 113 to the position beneath the N magnetic pole face 114, as shown in FIG. 3B. Thus, when the magnetic plate 11 is driven to the left side, the magnetic flux L will be cut through by the metallic wire 122. Then, positive or negative tunneling current is induced on the free end 123 of the metallic wire 122. The induced positive or negative tunneling current is directed to the metallic electrode plate 12 via the conductivity of the metallic wire 122. Here, it is assumed that the positive tunneling current is induced on the metallic electrode plate 12 when the magnetic plate 11 is driven to the left side, as shown in FIG. 3B. On the contrary, when the magnetic plate 11 is driven back to the right side, the magnetic flux L will also be cut through by the metallic wire 122, leading to induction of the negative tunneling current on the metallic electrode plate 12, as shown in FIG. 3C. The magnetic plate 11 is driven to cyclically move back and forth, so the magnetic flux L is repeatedly cut through by the metallic wire 122. Therefore, the alternative positive and negative tunneling currents can be continuously generated into the load 2. From the schematic diagrams in FIGS. 3A, 3B and 3C, the single metallic wire 122 can acquire the alternative tunneling current in a magnitude of more than 10 μA. However, since this invention may allow the use of plenty of metallic wires 122, say, 15,000 metallic wires 122, a total alternative tunneling current of about 150 mA can be provided, which is sufficient for charging a handset battery.

Figure 4A:
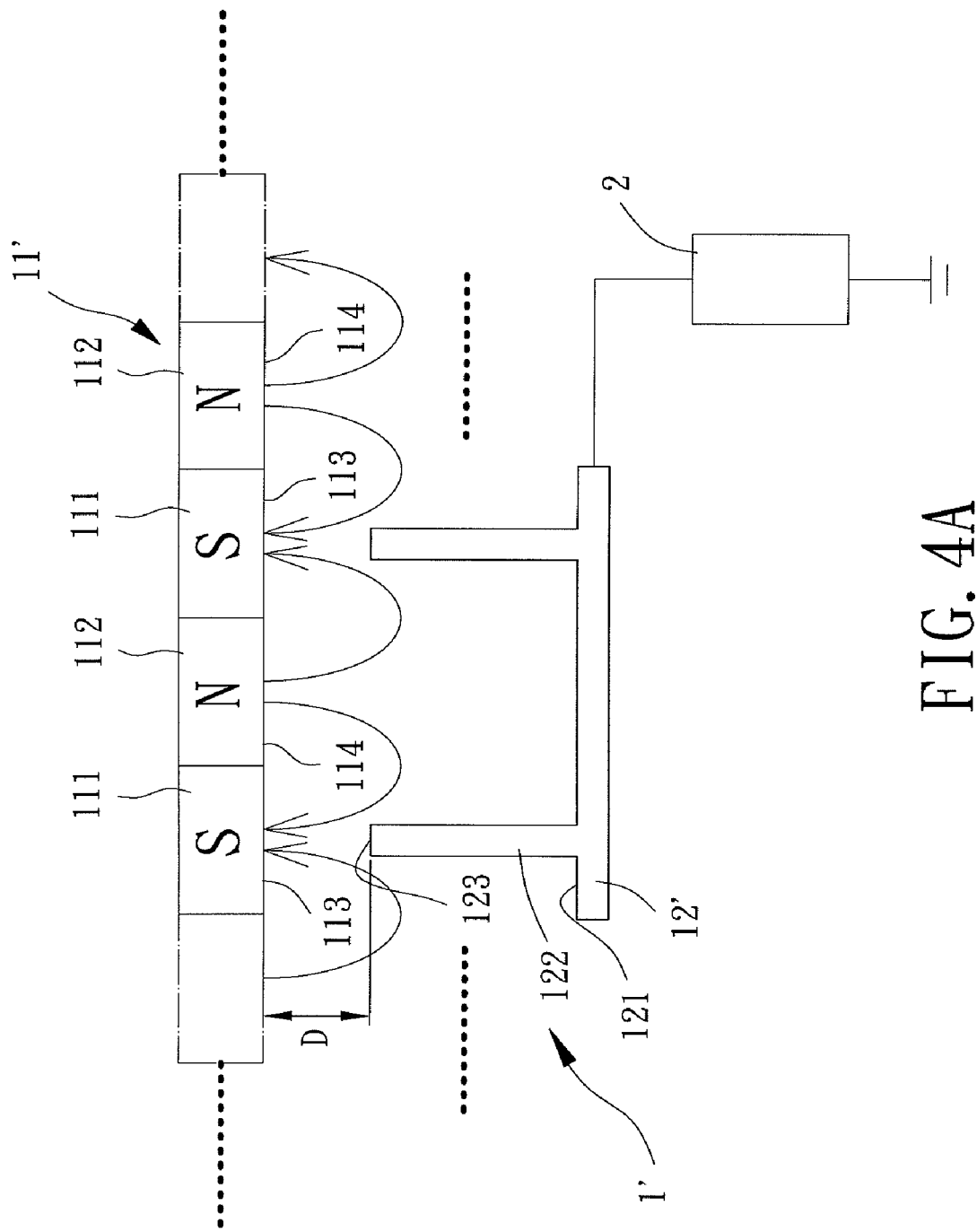
FIGS. 4A, 4B and 4C show an instantaneous magnetodynamic generator with two metallic wires and a plurality of pairs of S and N magnetic poles according to a second embodiment of the invention.
Figure 4B:
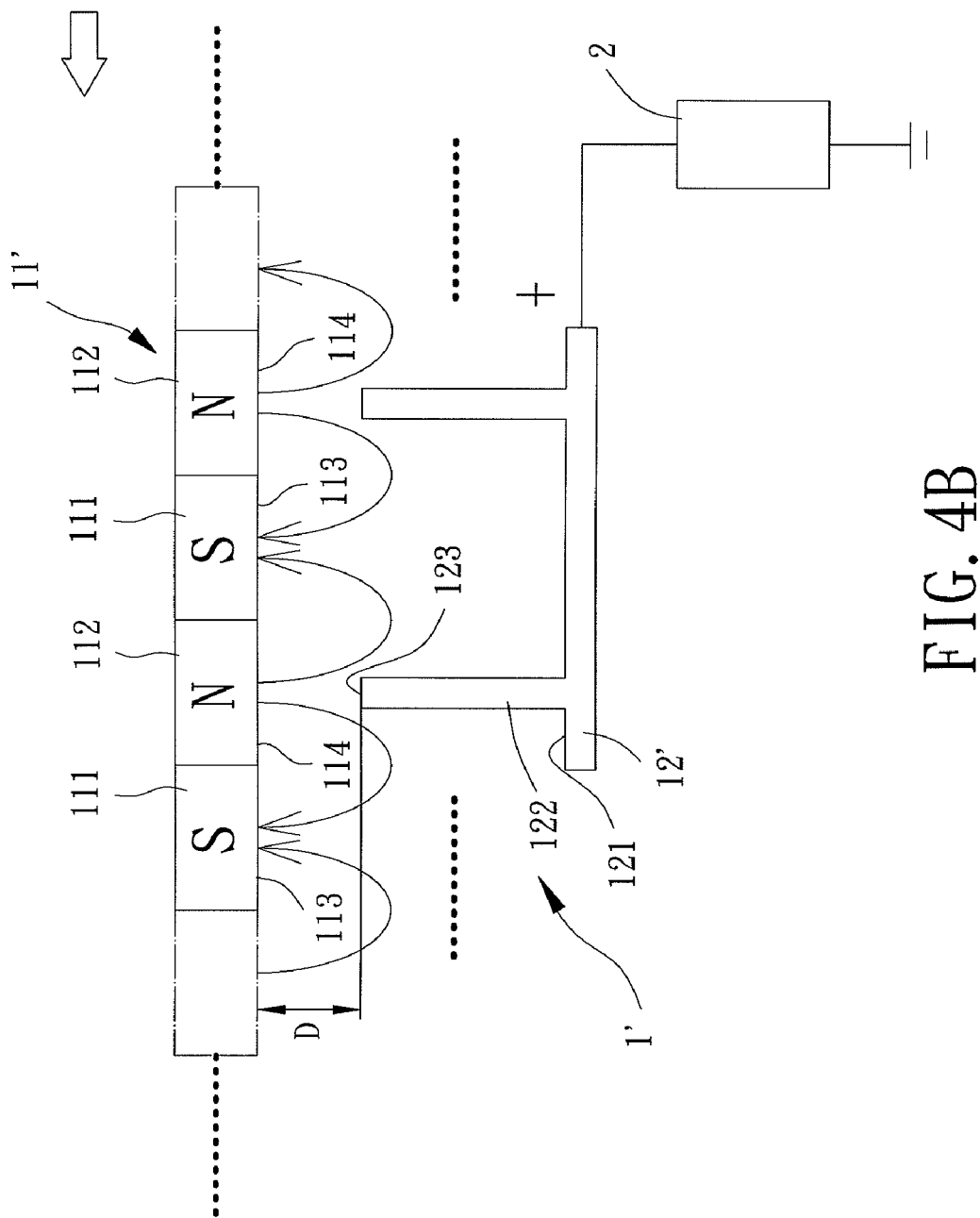
Figure 4C:
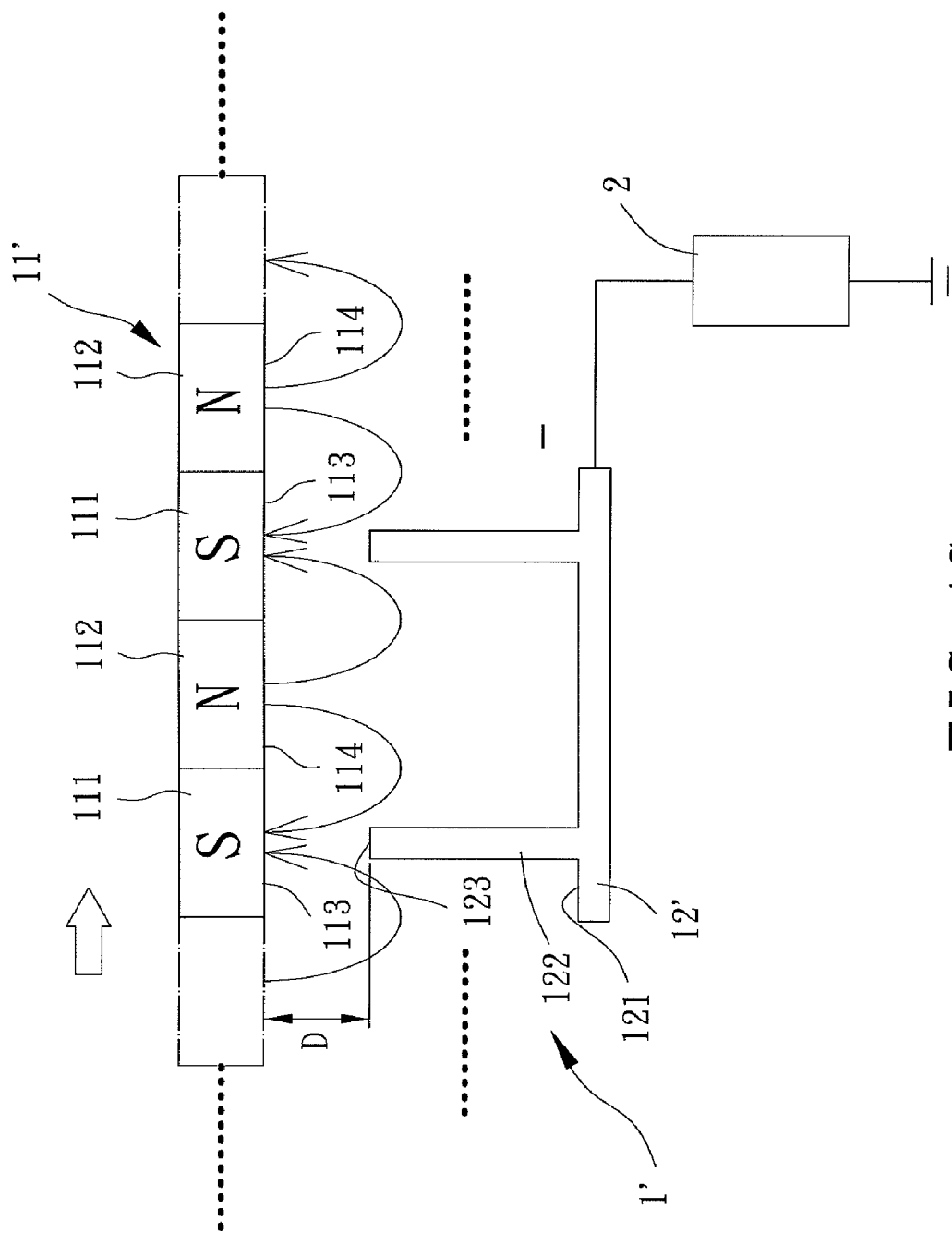

Another instantaneous magnetodynamic generator 1' is shown in FIG. 4A. In comparison with the instantaneous magnetodynamic generator 1 in FIG. 3A, the magnetic plate 11' includes a plurality of pairs of the S magnetic pole 111 and the N magnetic pole 112, and the metallic electrode plate 12' includes a plurality of metallic wires 122. In FIGS. 4A, 4B and 4C, the magnetic flux L is also radiated from the N magnetic pole face 114 to the S magnetic pole face 113. Each metallic wire 122 corresponds to a pair of the S magnetic pole 111 and the N magnetic pole 112, and also moves back and forth between the position beneath the S magnetic pole face 113 and the position beneath the N magnetic pole face 114. When the magnetic plate 11' is driven to the left side, as shown in FIG. 4B, the free end 123 of the metallic wire 122 is shifted from the position beneath the S magnetic pole face 113 to the position beneath the N magnetic pole face 114. Thus, the positive tunneling current is induced into the load 2, creating a positive voltage thereon. On the contrary, when the magnetic plate 11 is driven back to the right side, as shown in FIG. 4C, the negative tunneling current is induced into the load 2, creating a negative voltage thereon.

Based on one round of the left and right movement of the magnetic plate 11', the induced positive and negative tunneling currents will form a cycle of AC voltage, leading to generation of a cycle of AC tunneling current passing through the load 2. By constantly driving the magnetic plate 11' left and right, a continuous AC tunneling current may be generated into the load 2.

Figure 5A:
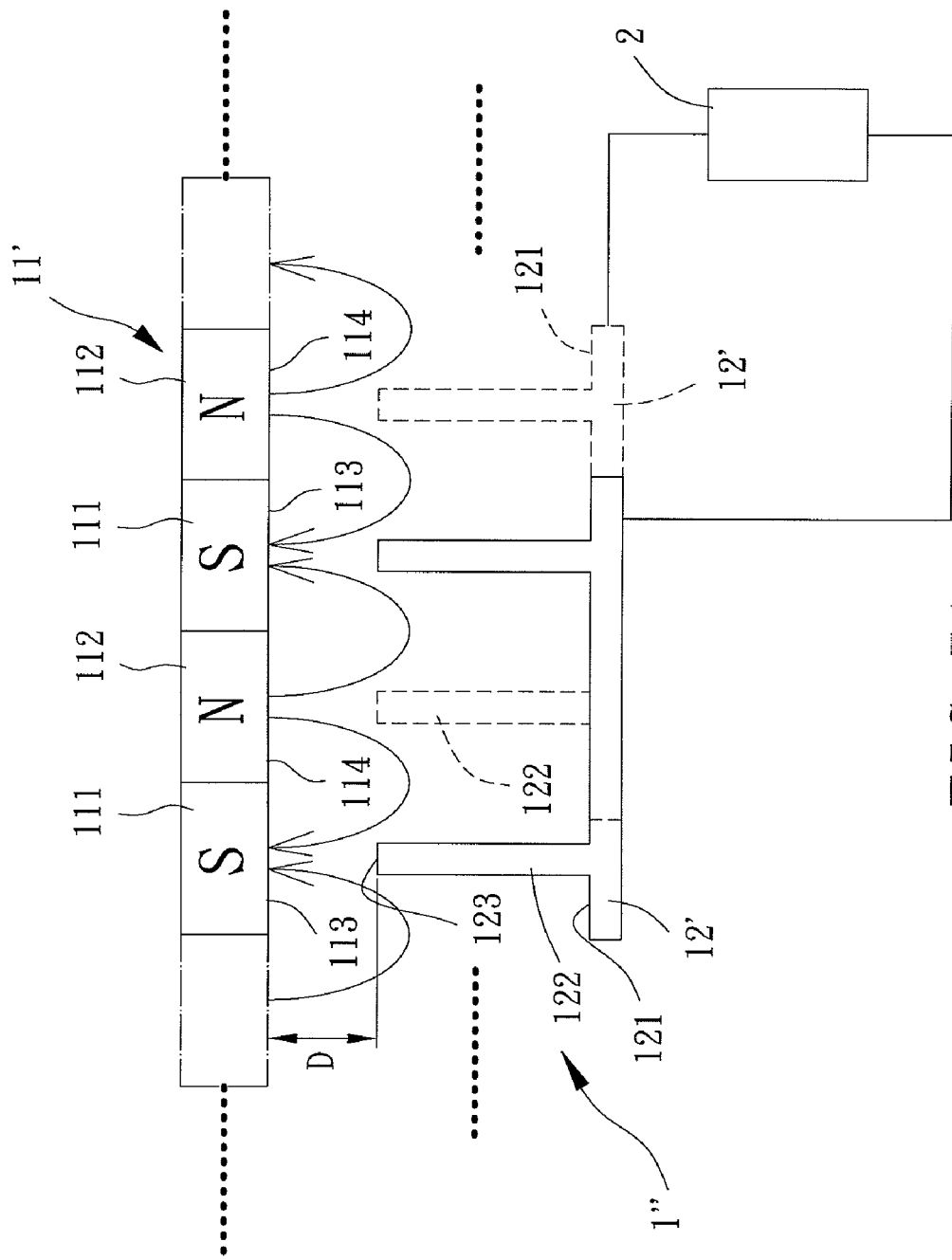
FIGS. 5A, 5B and 5C show an instantaneous magnetodynamic generator with a metallic wire array and a plurality of pairs of S and N magnetic poles according to a third embodiment of the invention.

Another instantaneous magnetodynamic generator 1" is shown in FIG. 5A. In comparison with the instantaneous magnetodynamic generator 1' in FIG. 4A, the instantaneous magnetodynamic generator 1" includes two metallic electrode plates 12' connected to two ends of the load 2. All metallic wires 122 of one metallic electrode plate 12' (represented by the solid lines) are initially located at the positions beneath the S magnetic pole faces 113, and those of the other metallic electrode plate 12' (represented by the dashed lines) are initially located at the positions beneath the N magnetic pole faces 114. Namely, the two metallic electrode plates 12' can coexist on the same plane.

Figure 5B:
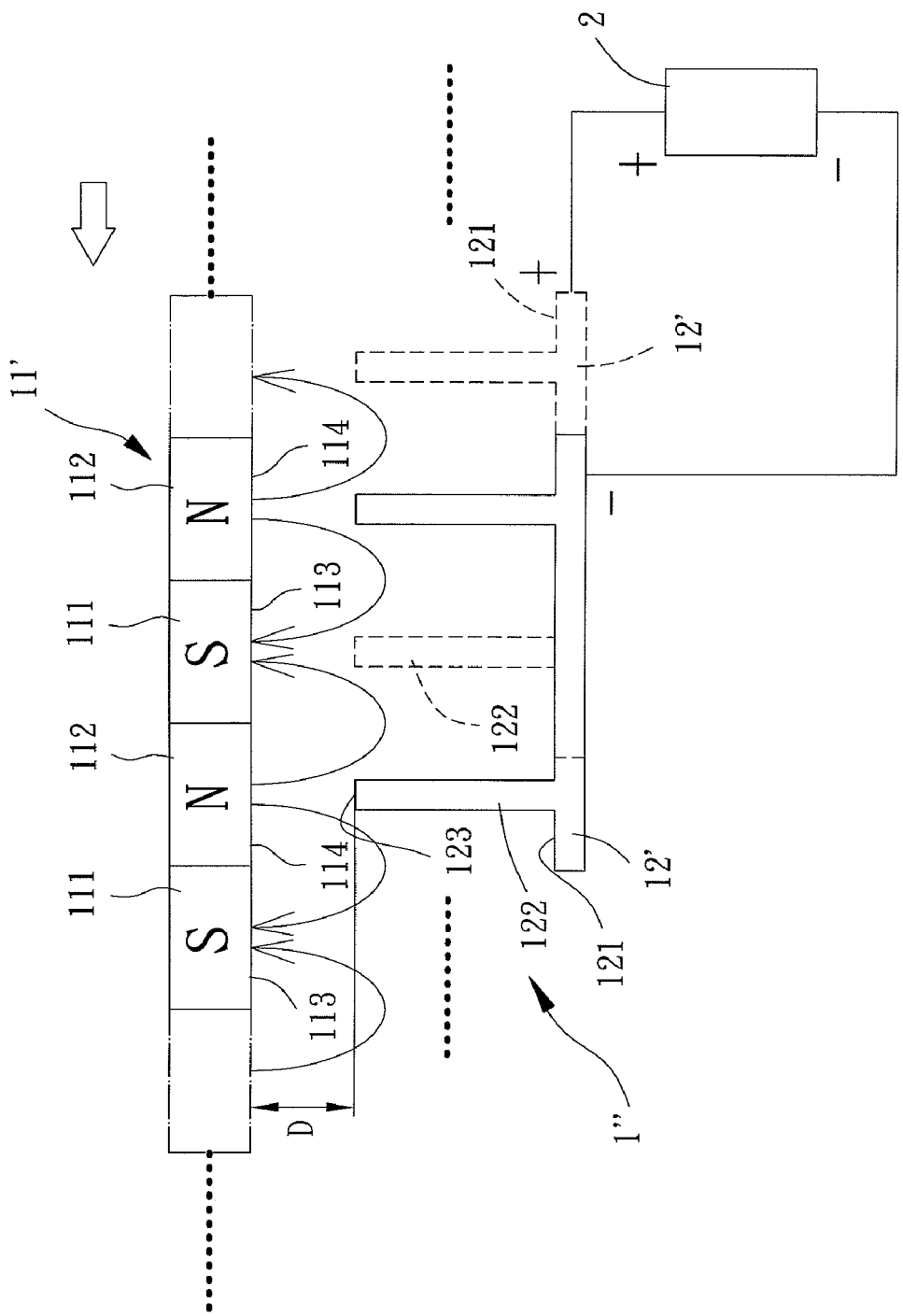
Figure 5C:
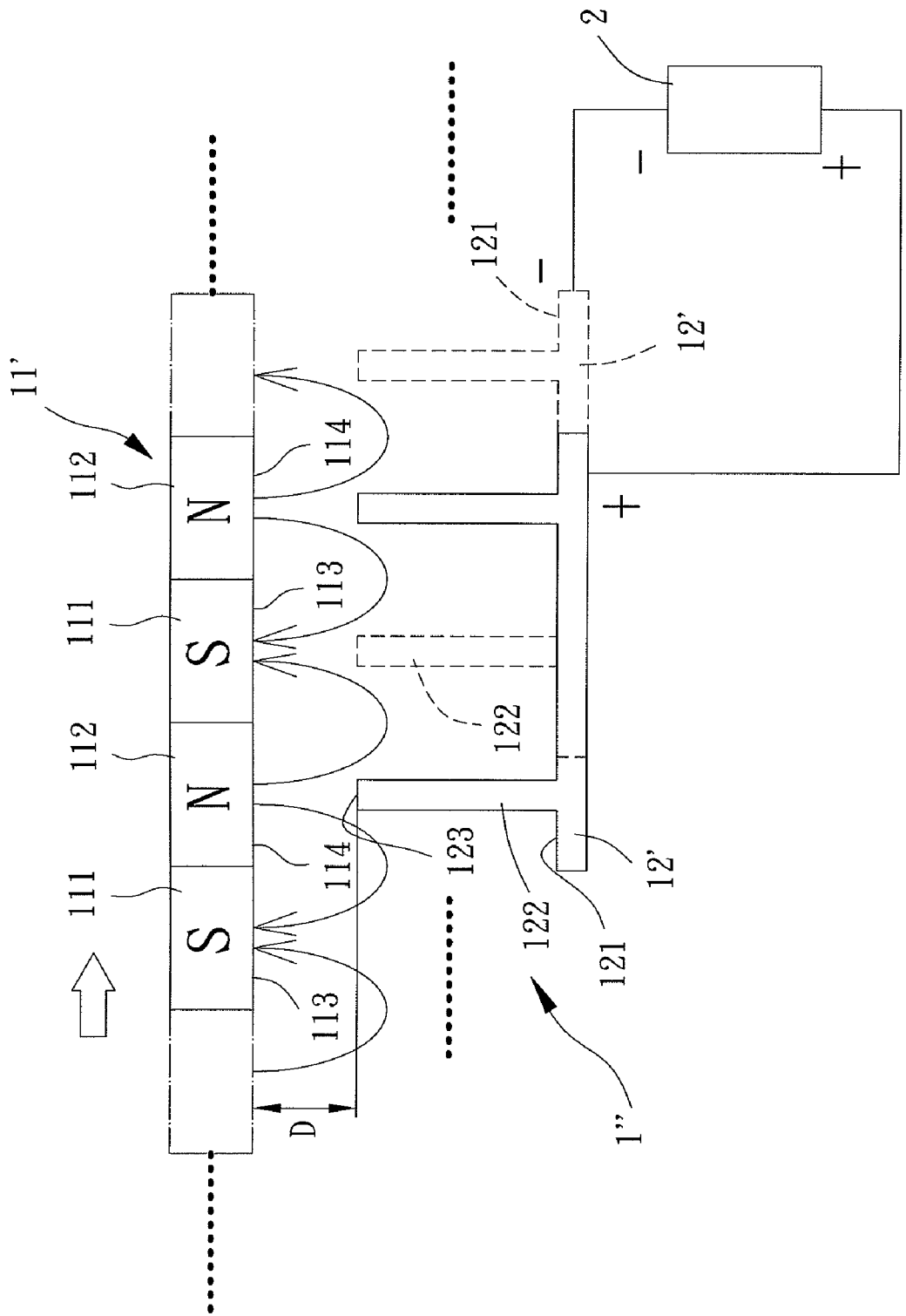

Based on the structure, when the magnetic plate 11' is driven to the left side, as shown in FIG. 5B, the negative tunneling current will be induced on one metallic electrode plate 12' (represented by the solid lines), and the positive tunneling current will be induced on the other metallic electrode plate 12' (represented by the dashed lines). The negative and positive voltage potentials are across the two metallic electrode plates 12' and the load 2. On the contrary, when the magnetic plate 11' is driven back to the right side, as shown in FIG. 5C, the other voltage potentials with opposite polarity will be established on the load 2. Note the free ends 123 of the metallic wires 122 of the two metallic electrode plates 12' have been described in FIGS. 4A, 4B and 4C, so the induced tunneling currents will not be described herein again.

Based on one round of the left and right movement of the magnetic plate 11', the induced positive and negative tunneling currents will form a cycle of AC voltage on the load 2, leading to generation of a cycle of AC current passing through the load 2. By constantly driving the magnetic plate 11' left and right, a continuous AC current may be generated into the load 2.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. An instantaneous magnetodynamic generator, comprising:
   a magnetic plate having at least one pair of N and S magnetic poles, wherein one magnetic pole of the at least one pair of N and S magnetic poles has a first magnetic pole face and the other magnetic pole of the at least one pair of N and S magnetic poles has a second magnetic pole face, with the first and second magnetic pole faces being contiguous; and
   a first metallic electrode plate having an electrode face and at least one metallic wire, wherein the electrode face faces and is parallel to the first and second magnetic pole faces, wherein the at least one metallic wire is connected to the first electrode plate and extends from the electrode face, wherein the at least one metallic wire has a free end moving between a position beneath the first magnetic pole face for a distance and a position beneath the second magnetic pole face for the distance to induce a positive or negative tunneling current on the first metallic electrode plate, with the magnetic plate and the first magnetic electrode plate moveable relative to each other parallel to the electrode face.

2. The instantaneous magnetodynamic generator as claimed in claim 1, wherein an ultrasonic wave is applied to drive the first metallic electrode plate for movement, forcing the free end of the metallic wire to move between the position beneath the first magnetic pole face and the position beneath the second magnetic pole face.

3. The instantaneous magnetodynamic generator as claimed in claim 1, wherein the free end is movably positioned parallel to the electrode face beneath the magnetic plate at a distance from 1 to 10 pm.

4. The instantaneous magnetodynamic generator as claimed in claim 1, wherein the at least one metallic wire is a nanowire.

5. The instantaneous magnetodynamic generator as claimed in claim 1, wherein the at least one pair of N and S magnetic poles includes a plurality of pairs of N and S magnetic poles, wherein one magnetic pole of each of the plurality of pairs of N and S magnetic poles has the first magnetic pole face and the other magnetic pole of each of the plurality of pairs of N and S magnetic poles has the second magnetic pole face, and wherein the at least one metallic wire includes a plurality of metallic wires each corresponding to a respective one of the plurality of pairs of N and S magnetic poles.

6. The instantaneous magnetodynamic generator as claimed in claim 5, further comprising a second metallic electrode plate having another electrode face and a plurality of metallic wires each corresponding to the respective one of the plurality of pairs of N and S magnetic poles, wherein the electrode face of the second metallic electrode plate faces and is parallel to the first and second magnetic pole faces, wherein each of the plurality of metallic wires is connected to the second metallic electrode plate and extends from the other electrode face, wherein each of the plurality of metallic wires has a free end moving between the position beneath the first magnetic pole face and the position beneath the second magnetic pole face to induce a positive or negative tunneling current on the second metallic electrode plate, and the first and second metallic electrode plates are spaced from each other on the same plane.

* * * * *